(12) United States Patent
Aiguebonne et al.

(10) Patent No.: US 9,335,002 B2
(45) Date of Patent: May 10, 2016

(54) TEMPORARY SUSPENSION ELEMENT

(75) Inventors: Yves Aiguebonne, Charenton-le-pont (FR); Jose Albuquerque, Charenton-le-pont (FR); Daniel Darmes, Charenton-le-pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 427 days.

(21) Appl. No.: 13/883,159

(22) PCT Filed: Oct. 26, 2011

(86) PCT No.: PCT/EP2011/068701
§ 371 (c)(1),
(2), (4) Date: May 2, 2013

(87) PCT Pub. No.: WO2012/059370
PCT Pub. Date: May 10, 2012

(65) Prior Publication Data
US 2013/0212855 A1    Aug. 22, 2013

(30) Foreign Application Priority Data
Nov. 5, 2010 (FR) ..................................... 10 59152

(51) Int. Cl.
*F16M 13/02* (2006.01)
*F16B 1/00* (2006.01)
*B23P 19/04* (2006.01)

(52) U.S. Cl.
CPC ................ *F16M 13/027* (2013.01); *F16B 1/00* (2013.01); *B23P 19/04* (2013.01); *Y10T 29/49815* (2015.01); *Y10T 29/49895* (2015.01); *Y10T 29/49947* (2015.01); *Y10T 29/49963* (2015.01)

(58) Field of Classification Search
CPC ......... F16M 13/027; F16B 1/00; B23P 19/10; B23P 15/00; B23P 19/04; Y10T 29/49815; Y10T 29/49826; Y10T 29/49895; Y10T 29/49947; Y10T 29/49963
See application file for complete search history.

(56) References Cited

U.S. PATENT DOCUMENTS

| 1,517,883 | A |   | 12/1924 | Alleman | ......................... 29/258 |
| 1,996,960 | A | * | 4/1935  | Haupt | .................... A45B 19/04 135/37 |
| 2,503,032 | A | * | 4/1950  | De Samelson | ......... A45B 25/14 135/20.3 |
| 2,937,653 | A | * | 5/1960  | Danciart | ................ A45B 25/08 135/37 |
| 5,904,462 | A |   | 5/1999  | Gonzalez | ...................... 411/342 |
| 2004/0200517 | A1 | * | 10/2004 | Ko | ......................... A45B 25/08 135/37 |

FOREIGN PATENT DOCUMENTS

DE          3716099 A1    1/1988

* cited by examiner

*Primary Examiner* — Sarang Afzali
(74) *Attorney, Agent, or Firm* — Norton Rose Fulbright US LLP

(57) ABSTRACT

A temporary suspension element comprises a rectilinear guide with a threaded end, and a catch which can swing between a guiding position and a retaining position. The element can temporarily replace screws that attach a structure under a support, during the attachment or disassembly of said structure. The attachment and the disassembly of the structure can then be performed by a single operator.

4 Claims, 3 Drawing Sheets

TEMPORARY SUSPENSION ELEMENT

The invention concerns a temporary suspension element, and attachment and disassembly methods which use this element.

It is common for structures to be suspended from supports using means of attachment such as screws to hold the structure permanently under the support. However, such means of attachment require manipulation and tools to install them. The structure must be held in position by other means during this installation, until the permanent means of attachment have been definitively installed and can hold the structure in suspension on their own. Most often, the structure is held in position by a first operator during the attachment, while a second operator installs the means of attachment. Two operators are therefore necessary simultaneously, which creates issues during repetitive attachment operations. Such attachment operations can occur during industrial processes which are repeated with each new manufacturing cycle. It is therefore important to determine an appropriate operating procedure which requires the intervention of only one operator.

In addition, the structure to be suspended may be heavy or cumbersome. There is a resulting risk to the operator(s) who are performing the attachment, in case the structure accidentally tips or falls.

A first object of the invention is therefore to provide tools for suspending a heavy structure, which allows an operator to suspend the structure by himself.

A second object of the invention consists in increasing the safety of the operation of attaching a structure in suspension under a support, for the operator who is performing this operation.

A third object of the invention is to facilitate the operation of attaching a structure in suspension under a support when the attachment is produced by screws, without it being necessary to modify the structure or the support.

A fourth object of the invention consists in providing tools to assist with attaching structures to be suspended, which can be recovered after each use and reused without having to disassemble each structure attached in this manner.

Lastly, a fifth object of the invention consists in providing such an assistance without significantly increasing the total cost of the attachment operation.

To achieve these objects, the invention proposes a temporary suspension element which comprises:
- a rectilinear guide which has threading at one end, and which has a cavity relative to an outside sliding surface of the guide, said cavity being at a distance from the threaded end of the guide;
- a transverse pin, which passes through the cavity, perpendicularly to a longitudinal direction of the guide; and
- a catch which rotates around the pin and can swing between a guiding position and a retaining position.

The element is arranged so that the catch in the guiding position is at least partially contained in the cavity, with the distal end of the catch being closer than the transverse pin to the threaded end of the guide. In addition, the catch in the retaining position swings out of the cavity relative to the guiding position, so that the distal end of the catch protrudes more, relative to the outside sliding surface, in the retaining position than in the guiding position.

In addition, the retaining position of the catch is determined by the guide acting as a stop for the catch, so that an angle between the longitudinal direction of the guide and a direction connecting the transverse pin to the distal end of the catch in the retaining position is less than 90° on the side of the threaded end.

Because of its threaded end, such temporary suspension element is suitable for temporary installation in place of a holding screw in order to maintain a structure under a support. The structure can then be slid onto the guide of the temporary suspension element by one of the screw holes in the structure, until the catch projects below the structure. The catch, which is then in the retaining position, can hold the suspended structure in the attachment position while the first means of permanently attaching the structure under its support are installed, away from the temporary suspension element. Said temporary element can then be removed by unscrewing it and optionally replacing it with a screw which completes the permanent attachment of the structure under the support.

By using the temporary suspension element, a single operator is sufficient for attaching the structure under the support. The temporary suspension element holds the structure in suspension while the permanent means of attachment are installed.

In addition, the safety of the operator during the attachment operation is improved in comparison to using a second operator, who could make inadvertent movements causing injury to one of the operators.

Lastly, such temporary suspension element is inexpensive and rapid to use. In other words, it does not significantly increase the duration or the cost of the attachment operation. In addition, the temporary suspension element is recovered once the structure has been permanently attached.

In an improvement of the temporary suspension element, the center of gravity of the catch may be offset relative to the transverse pin, towards a cavity opening in the outside sliding surface of the guide. In this manner, when the element is vertically oriented with the threaded end of the guide upwards, the weight of the catch causes the catch to swing into the retaining position. The catch can thus come spontaneously into the retaining position once the temporary suspension element has been installed, without the operator having to release the structure to activate the catch. This further facilitates the structure attachment operation. In addition, no spring is required to swing the catch from the guiding position to the retaining position, simplifying the assembly of the temporary suspension element.

In addition, it is advantageous for the transverse pin and the catch in the guiding position to be contained inside the external sliding surface. It is then unnecessary under these conditions to provide passages at the edges of the attachment holes to accommodate the extremities of the transverse pin and the catch in the guiding position when the structure is slid along the guide.

Similarly, the element may preferably be arranged so that the guide acts as a stop for the catch inside the cavity.

The invention also concerns a method for attaching a heavy structure in suspension under a support, which uses one or more temporary suspension element(s) as described above. Such an attachment method comprises the following steps, when the structure is intended to be attached to the support by at least two screws introduced through respective holes in the structure into respective parallel tapped holes in the support:
- /1a/ screwing at least one temporary suspension element into one of the tapped holes in the support, while leaving free at least one other of the tapped holes;
- /2a/ raising the structure towards the support by sliding it along each temporary suspension element used, with each temporary suspension element used guiding the structure by the hole corresponding to the tapped hole in the support used in step /1a/, until the catch of each temporary suspension element used swings into the retaining position under the structure;

/3a/ resting the structure on the catch in the retaining position of each temporary suspension element used;

/4a/ while the structure is suspended on the catch in the retaining position of each temporary suspension element used, introducing a first screw through each of the unoccupied holes in the structure and screwing it into the support;

/5a/ unscrewing and removing each temporary suspension element used while the structure remains suspended by each first screw; then /6a/ introducing a second screw through the structure and screwing it into the support, in place of each temporary suspension element used.

The temporary suspension element(s) is (are) also useful for disassembling the support structure. The initial configuration is then the structure being attached to the support by at least two screws introduced into respective parallel tapped holes in the support through respective holes in the structure. The invention therefore additionally proposes a method for disassembling the structure suspended under the support, comprising the following steps:

/1b/ unscrewing and removing at least one first screw from the support and the structure, leaving in place at least one second screw which holds the structure against the support;

/2b/ introducing a temporary suspension element into the hole of the structure in place of each first screw removed, and screwing each temporary suspension element used into the corresponding tapped hole in the support;

/3b/ ensuring that the catch of each temporary suspension element used is in the retaining position;

/4b/ unscrewing each second screw, so that the structure comes to rest against the catch in the retaining position of each temporary suspension element used;

/5b/ while the structure remains suspended on the catch in the retaining position of each temporary suspension element used, completely removing each second screw; then /6b/ pressing on the catch of each temporary suspension element used in order to swing it into the guiding position, and lowering the structure by sliding it along each temporary suspension element used, with the temporary suspension element guiding the structure by the corresponding hole.

Advantageously, in the above attachment and disassembly methods, the tapped holes in the support can be vertically oriented, and each temporary suspension element used has a catch with a center of gravity which is offset relative to the transverse pin. The catch then swings automatically into the retaining position at the end of steps /2a/ and /2b/.

Lastly, in the above attachment and disassembly methods, four screws are preferably used to attach the structure to the support, and two temporary suspension elements are used simultaneously in a symmetrical manner relative to the center of gravity of the structure when it is attached to the support. The structure thus can be suspended in a balanced manner on the catches of the two temporary suspension elements in the retaining position during steps /4a/ and /5b/.

Other features and advantages of the invention will be apparent from the following description of a non-limiting exemplary embodiment with references to the attached drawings, in which.

In these figures, the same references indicated in different figures denote identical elements or elements with identical functions. The dimensions indicated are expressed in millimeters.

Figure 1:
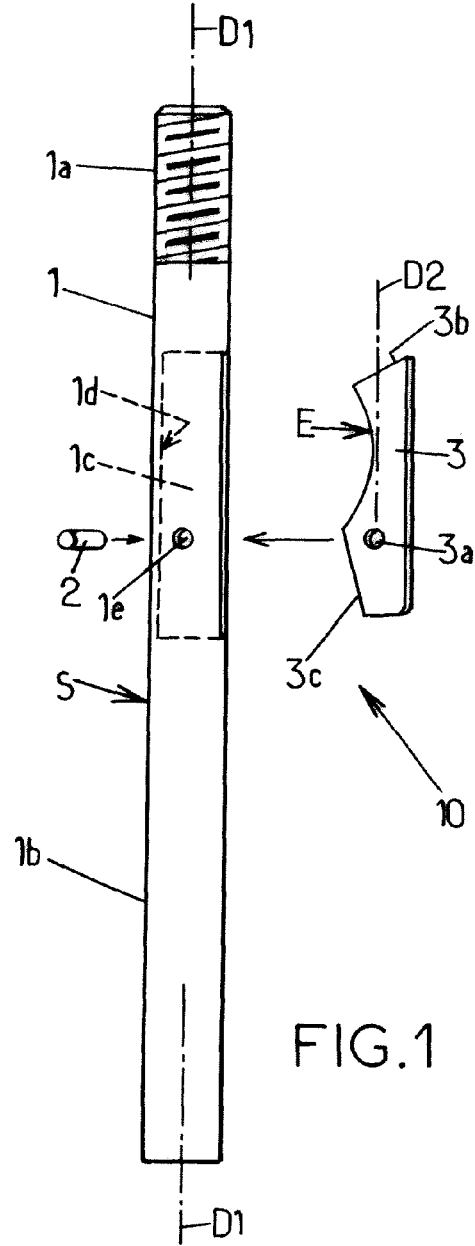
FIG. 1 is an exploded view of a temporary suspension element of the invention.

In FIG. 1, a temporary suspension element 10 comprises a rectilinear guide 1, a transverse pin 2, and a catch 3.

The rectilinear guide 1 comprises a threaded end 1a and a cavity 1c which is at a distance from the threading of the end 1a. As is visible in FIG. 2b, the cavity 1c may have the shape of a slot inside the width of the guide 1. D1 denotes the longitudinal direction of the rectilinear guide 1. The outside surface S of the guide 1 is smooth and parallel to the direction D1 in order to form a sliding surface, except for the threaded end 1a and the cavity 1c. The guide 1 may be created from a cylindrical bar, for example a metal bar.

Optionally, the rectilinear guide 1 may have a gripping end 1b which is opposite the end 1a in the direction D1, with the length of the end 1b being greater than 50 mm (millimeters) from the transverse pin 2. Possibly, the gripping end 1b may be rounded or conical to facilitate introducing it into the holes of an external structure.

As an example, the length of the guide 1 may be 110 mm in the direction D1, it may be 8 mm in diameter, the length of the threading may extend 15 mm from the end 1a, and the cavity 1c may extend from the 25 mm measurement to the 55 mm measurement when measured from the end 1a in the direction D1. The depth of the cavity 1c perpendicular to the direction D1 may be 7 mm. Under these conditions, the length of the gripping end 1b may be 55 mm in the direction D1, starting from the cavity 1c. In addition, the cavity 1c has an opening on one side perpendicular to the direction D1, and it is closed on the opposite side so that the guide 1 forms the cavity bottom 1d.

Figure 2A:
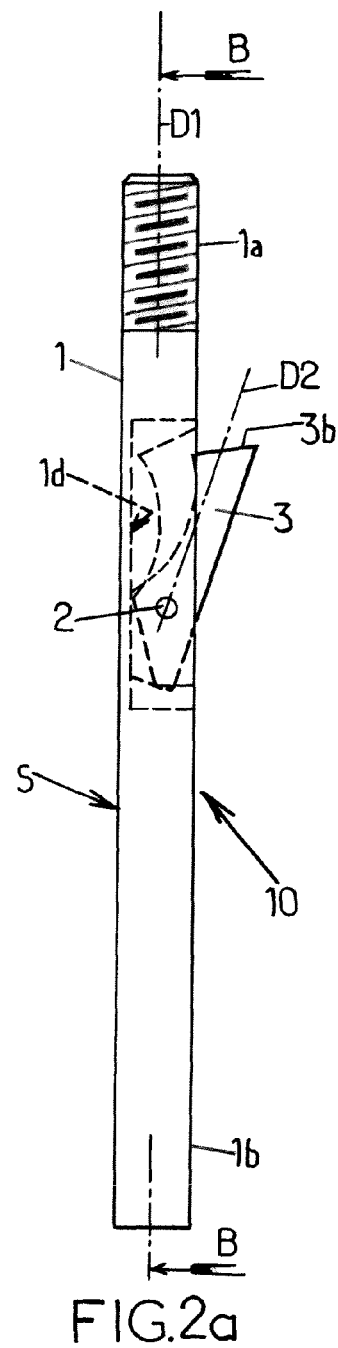
FIG. 2a is a side view of the temporary suspension element of FIG. 1.
Figure 2B:
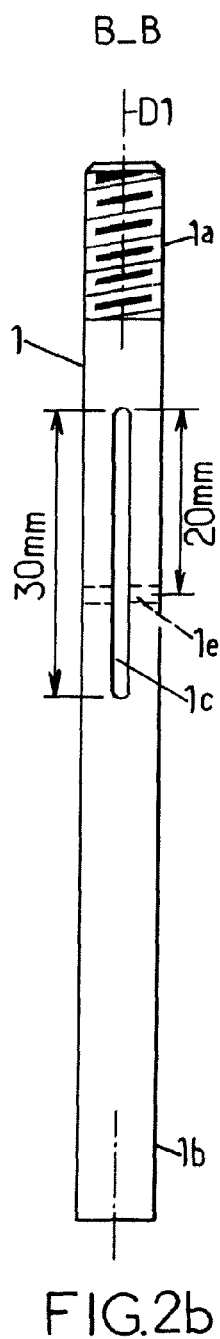
FIG. 2b is a profile view of a rectilinear guide which is part of the temporary suspension element in FIG. 1.

The transverse pin 2 passes through the cavity 1c perpendicularly to the direction D1, while being held by the guide 1 on each side of the cavity 1c. FIGS. 1 and 2b show the hole 1e which is made in the guide 1 for receiving the pin 2. The diameter of the pin 2 may be 2.0 mm. Preferably, the length of the pin 2 is adjusted so that its ends do not pass beyond the outside surface S of the guide 1 through the openings of the hole 1e.

The catch 3 (FIGS. 1 and 3) may be flat, with a thickness of 2.0 mm for example. It has a hole 3a for assembling it to rotate around the transverse pin 2 inside the cavity 1c. The diameter of the hole 3a and the width of the cavity 1c are selected so that the catch 3 swings freely around the pin 2. For example, the width of the cavity 1c may be 2.5 mm, and the diameter of the hole 3a may be 2.1 mm. D2 denotes the longitudinal direction of the catch 3.

The dimensions of the catch 3 are such that it can swing between a guiding position, in which it is contained inside the cavity 1c, and a retaining position in which it partially projects from the cavity 1c. In FIG. 2a, the catch 3 is represented in the retaining position as a solid line, and in the guiding position as a dotted line. In the guiding position, the directions D1 and D2 can be parallel. In the retaining position, the end 3b of the catch 3 opposite the pin 2 and nearer to the end 1a of the guide 1, referred to herein as the distal end, projects beyond the outside surface S of the guide 1. Preferably, the end 3b does not protrude above the outside surface S in the guiding position, so that it does not interfere with an external structure sliding on this outside surface.

Figure 3:
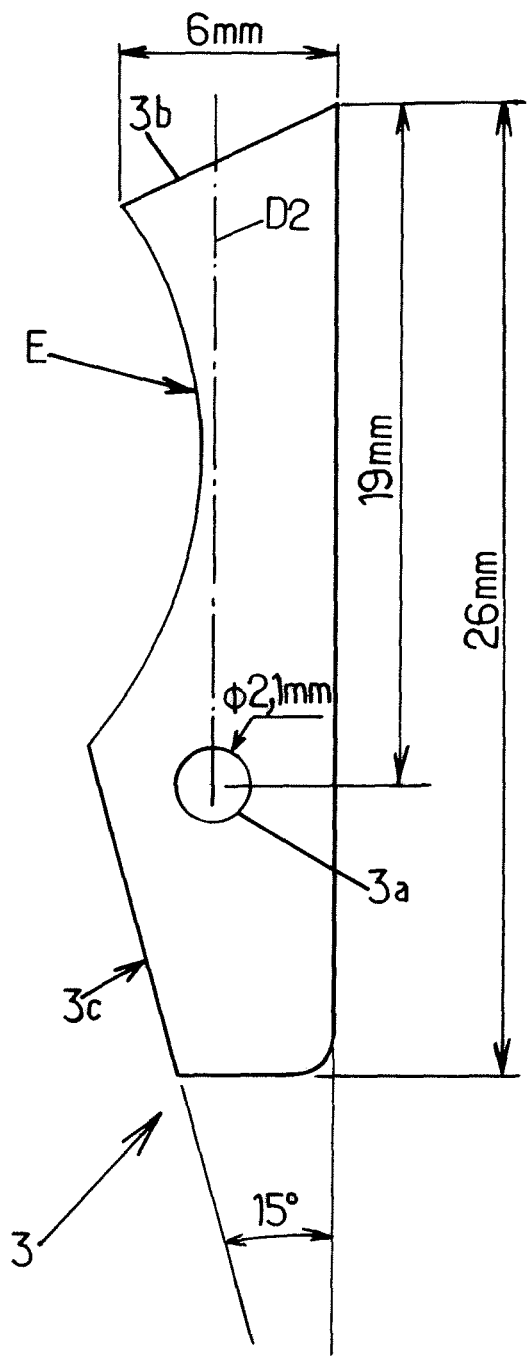
FIG. 3 is a plan view of a catch which is part of the temporary suspension element in FIG. 1.

The catch 3 may have a heel 3c opposite the distal end 3b relative to the pin 2 in the direction D2. The shape and dimensions of the heel 3c are selected so that the heel rests against the bottom 1d of the cavity 1c in the retaining position. For example, the angle between the two directions D1 and D2 in the retaining position may be 15°, which may correspond to the angle of the heel 3c (FIG. 3). The length of the catch 3 between its hole 3a and the distal end 3b may be 19 mm, its total length in the direction D2 may be 26 mm, and its width perpendicular to the direction D2 may be 6 mm. It is also possible for the distal end 3b to be angled, so that an edge of this end is perpendicular to the direction D1 in the retaining position. Thus, the catch 3 can effectively prevent the external structure from sliding on the outside surface S of the guide 1 in the direction of the gripping end 1b.

Lastly, the catch 3 may have a notch E on the side facing the bottom 1d of the cavity 1c. This notch E shifts the center of gravity of the catch 3 to the other side of the pin 2, so that the catch 3 spontaneously swings into the retaining position under the effect of gravity when the guide 10 is vertically positioned with the direction D1 parallel to the direction of gravity and the end 1a being the upper end.

Figure 4:
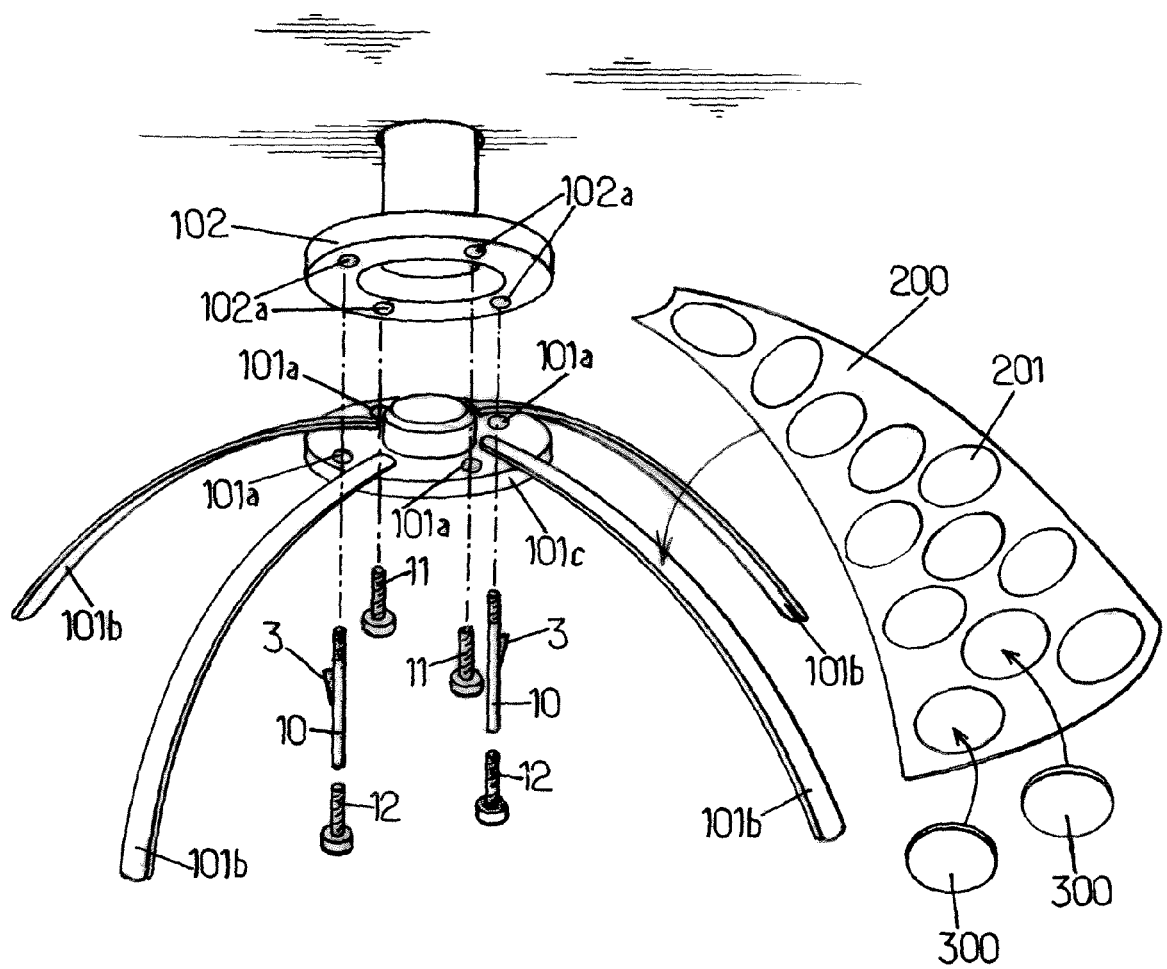
FIG. 4 illustrates an assembly using the temporary suspension elements of FIGS. 1 to 3.

FIG. 4 illustrates a specific use of two temporary suspension elements 10 as described above. The reference 102 denotes a support in the shape of a rotating drive hub of a structure. The support 102 can be located in an upper wall of a material deposition chamber, for example a deposition chamber which uses thermal evaporation. The structure may then be a sample carrier consisting of four downwardly curving arms 101b integrally attached to a common base 101c. In the following text, the base 101c and the four arms 101b are collectively referred to as the structure 101. Four pierced plates 200 are to be placed on the arms 101b at a later time. Holes 201 in the plates 200 are provided for exposing eyeglass lenses 300 to the evaporated material.

During a material deposition cycle, the structure 101 is suspended from the support 102 inside the chamber. To achieve this, the base 101c may be equipped with four holes 101a to be aligned with four bored holes 102a provided in the support 102. The structure 101 can be attached by screws inserted through the holes 101a into the support 102.

We will first describe the attachment of the structure 101 to the support 102. The structure 101 is initially distanced from the support 102. Two temporary attachment elements 10 are screwed into two of the bored holes 102a in the support 102. If the bored holes 102a are vertical, the catches 3 for the two elements swing out into the retaining position. Preferably, the two bored holes 102a used are diagonally opposite relative to the center of the support 102. The structure 101 is then slipped onto the elements 10, using the holes 101a which correspond to the bored holes occupied by the elements 10. As the structure 101 is raised, it slides along the outside surface S of the elements 10, pushing the catches 3 back into their respective cavities 1c. When the structure 101 comes close to the support 102, the catches 3 swing back out into the retaining position, and the structure 101 can rest on the catches 3. Given that the two temporary suspension elements 10 are symmetrically placed relative to the center of gravity of the structure 101 when it is attached to the support 102, the structure 101 is suspended on the catches 3 in a stable equilibrium. Then two screws 11 are introduced into the two unused holes 101a, and are screwed into the corresponding bore holes 102a. The length of the screws 11 must be sufficient to cross the distance between the support 102 and the structure 101 when the latter is resting on the catches 3. Tightening the screws 11 progressively lifts the structure 101 above the catches 3 and presses it against the support 102. The temporary suspension elements 10 are then unscrewed and replaced with two other screws 12.

To disassemble the structure 101 once it is in this state, two of the four screws are first removed, preferably two screws 12 which are diagonally opposite. These are replaced with two temporary suspension elements 10. The respective catches 3 of these elements spontaneously swing into the retaining position. The two other screws 11 are then partially unscrewed, and the structure 10 descends until it rests on the catches 3. The last two screws 11 are then completely removed. Finally, the operator slides the two catches 3 into the cavities 1c while holding the structure 101 by the bottom, and then progressively lowers the structure by sliding it along the elements 10.

It is understood that the invention can be reproduced by varying some details of the description just given, while retaining at least some of the cited advantages. In particular, the described dimensions are only provided as examples.

The invention claimed is:

1. A temporary suspension element comprising:
   a rectilinear guide with a central longitudinal axis having threading at one end, and having a cavity relative to an outside sliding surface of said guide, said cavity being at a distance from the threaded end of the guide;
   a transverse pin having a central longitudinal axis passing through the cavity, located on and perpendicular to the central longitudinal axis of the guide; and
   a catch having a longitudinal axis extending from a pivot point defined by the transverse pin to a distal end which rotates around said transverse pin and can swing between a guiding position and a retaining position, the catch having a center of gravity, wherein:
      the catch in the guiding position is at least partially contained in the cavity, with the distal end of the catch being closer than the transverse pin to the threaded end of the guide;
      the catch in the retaining position swings out of the cavity relative to the guiding position, such that the distal end of the catch protrudes more, relative to the outside sliding surface, in the retaining position than in the guiding position;
      the retaining position of the catch is determined by the guide acting as a stop for the catch, so that an angle between the central longitudinal axis of the guide and the longitudinal axis of the catch in the retaining position is less than 90° on the side of the threaded end; and
      the center of gravity of the catch is offset relative to the transverse pin, towards an opening of the cavity in the outside sliding surface of the guide, so that when said element is vertically oriented with the threaded end of the guide upwards, the weight of the catch causes said catch to swing into the retaining position.

2. The element according to claim 1, wherein the rectilinear guide has a gripping end opposite the threaded end of said guide on the central longitudinal axis, said gripping end having a length greater than 50 mm from the transverse pin.

3. The element according to claim 1, wherein the transverse pin is contained inside the outside sliding surface, and the catch in the guiding position is also contained inside said outside gliding surface.

4. The element according to claim 1, wherein the rectilinear guide is configured to act as a stop for the catch inside the cavity.

* * * * *